May 13, 1930. P. G. WILLETTS 1,758,903
REFRACTORY BLOCK
Filed April 6, 1926

Inventor
P. G. Willetts
by Robson D Brown
Attorney.

Patented May 13, 1930

1,758,903

UNITED STATES PATENT OFFICE

PAUL G. WILLETTS, OF BERLIN, CONNECTICUT, ASSIGNOR TO HARTFORD-EMPIRE COMPANY, OF HARTFORD, CONNECTICUT, A CORPORATION OF DELAWARE

REFRACTORY BLOCK

Application filed April 6, 1926. Serial No. 100,121.

My invention relates to refractory blocks for use in the glass-contacting portions of glass tanks and for other purposes.

The primary object of my invention is to provide a tank block for glass tanks which may be assembled with other similar blocks to provide a wall through which molten glass cannot readily leak, even though the glass is at a high temperature and is consequently very fluid.

Glass tanks are ordinarily lined with rectangular blocks having all of their sides smooth. These blocks are laid side by side and usually are not united by any form of luting. Therefore, the molten glass is able to penetrate between the blocks to a greater or less extent. When the molten glass is viscous and thick this penetration between the blocks does no harm because the glass entering between the blocks quickly freezes and thus prevents leakage from the tank.

New refractories which have been developed for glass tanks are able to withstand exceedingly high temperatures and permit the glass to be handled at higher temperatures than were formerly practicable. This is an advantage in many respects, but the hotter glass, being much more fluid than cooler glass, and also being slower in freezing, leaks through the joints between the tank blocks much more readily than the cooler glass and is thus likely to produce serious leakage. The glass leaking between blocks is also a disadvantage when insulation is applied to the outside of the tank blocks, since the molten glass damages the insulation with which it comes in contact.

It is well understood in the art that the greatest amount of corrision or wear on tank blocks is due to an upward drilling action which occurs whenever the glass penetrates a horizontal or substantially horizontal joint. The upward drilling is very rapid and honeycombs the underside of the refractory blocks wherever the glass has penetrated into a joint. This drilling phenomenon is not thoroughly understood, but deep pencil-like holes are produced, the glass penetrating by an upward movement to near the tops of these holes, and their upper portions being filled with gases or vapors which have been evolved from the glass below. It is generally understood that trapped gases in equilibrium with glass at a sufficiently high temperature is a very corrosive combination. These gases or vapors evolved from the glass which has penetrated a joint drill upwardly in varying lengths, and due to the somewhat conical shape of the bottoms of the drill holes, the bottom portions of the blocks are split or eroded away, so that the wall presents a substantially saw-tooth appearance after the furnace has been in use for a considerable time. In seeking to remedy this evil, means for avoiding the penetration of the glass into these joints is desirably provided in the construction, this being one of the objects of my invention.

According to my present invention, I provide a tank block having corrugations or other interlocking projections on its abutting sides so that, when the blocks are assembled together in a tank wall, the molten glass cannot leak between the blocks except by following a tortuous path. I preferably arrange the blocks in such a way that the glass entering the joints between the blocks moves in a direction contrary to the direction in which the glass is moving in the tank adjacent to the tank wall. The gases or vapors given off by the hot glass at the side walls of the tank generally press upward. I arrange the tank blocks so that the horizontal joints between the blocks extend downwardly, either at the glass-engaging surfaces of the blocks or slightly inside of such surfaces. Therefore, the upward pressure of the gas and movement of the glass entering the joints in the tank wall act to oppose the tendency of these gases or vapors to penetrate between the blocks.

Figure 1:
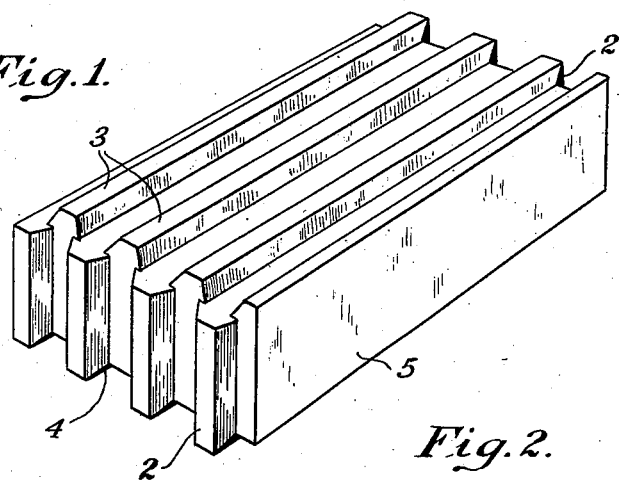
Figure 1 is a perspective view of a tank block constructed in accordance with my invention.
Figure 2:
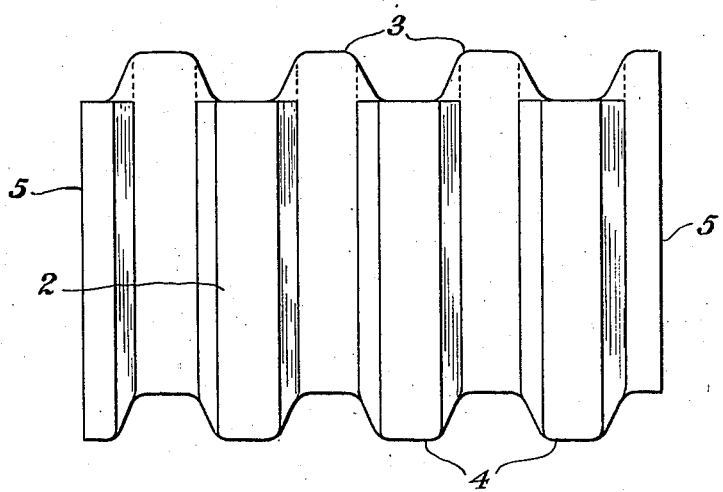
Fig. 2 is an end elevational view of the block shown in Fig. 1.

As shown in the drawing, each tank block consists of a rectangular body having projections or corrugations 2 formed on its ends and similar projections 3 and 4 formed on two opposite sides. The remaining surfaces 5 of the block are preferably left plain. The corrugations 3 and 4 are arranged so that the thickness of the block is the same whether measured at the tops of the corrugations or at the bottoms of the corrugations.

Figure 3:
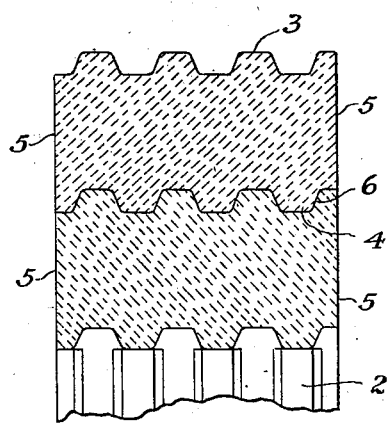
Fig. 3 is a transverse vertical sectional view through a portion of the lining of a tank wall constructed of blocks such as those shown in Figs. 1 and 2.

The sides of the corrugations 2, 3 and 4 are preferably tapered as shown, so that the projections of one block will fit the depressions between the corrugations of the adjacent blocks, as shown in Fig. 3.

The blocks described above are preferably assembled with the longer corrugated surfaces at the top and at the bottom and with the joint between the corrugations adjacent to the glass-contacting surfaces extending downward. Thus, if it is assumed that the right-hand surfaces 5 of Fig. 3 are the glass-contacting surfaces of the blocks, then it will be observed that the joint 6 between the blocks at the glass-contacting surface extends first inwardly for a distance and then downwardly. This has the advantage pointed out above, that the molten glass, in order to penetrate for any considerable distance between the blocks on their horizontal joints, must move downwardly shortly after entering between the blocks, whereas the gases or vapors adjacent to the glass-contacting surfaces of the blocks moves upward, thus opposing the tendency of the gases or vapors to seep between the blocks.

Similarly, the ends of the blocks are interlocked by their end corrugations. The end corrugations are preferably arranged so that any glass penetrating between the ends of the blocks will be forced to travel in a direction opposed to the forward travel of the glass adjacent to the blocks.

The blocks in adjacent superposed courses are preferably staggered so as to break the vertical joints between the blocks, thereby increasing the resistance offered to the penetration of glass between the blocks.

The particular form of corrugations herein shown and described is well suited for the purposes of my invention and I also prefer to provide several corrugations on each of the four corrugated surfaces of the blocks. However, the blocks may be designed somewhat differently in these respects by increasing or decreasing the number of the corrugations on each surface and by altering the specific shapes of these corrugations. It will therefore be understood that my invention is not limited to the precise details herein shown, the scope of my invention being indicated in the appended claim.

I claim as my invention:

A wall for glass furnaces for contact with the molten glass therein comprising a plurality of refractory blocks having interengaging corrugations parallel to the glass-contacting face of said wall to form tortuous joints between the blocks, the corrugations in the joints between superimposed courses of blocks having contacting surfaces adjacent to the glass-contacting face of the blocks which extend downwardly, whereby to minimize the erosive action upon the blocks of the upwardly moving gases evolved from the molten glass when it penetrates a short distance into the joints.

Signed at Hartford, Conn., this 30th day of March, 1926.

PAUL G. WILLETTS.